United States Patent [19]
Li et al.

[11] Patent Number: 5,853,202
[45] Date of Patent: Dec. 29, 1998

[54] HOSE END FITTING ASSEMBLY

[75] Inventors: Trent Kuang Chun Li, Troy; Norman S. Martucci, Clarkston, both of Mich.

[73] Assignee: Teleflex Incorporated, Plymouth Meeting, Pa.

[21] Appl. No.: 877,116

[22] Filed: Jun. 17, 1997

[51] Int. Cl.⁶ ............................. F16L 33/00; F16L 33/20
[52] U.S. Cl. ........................................ 285/256; 285/259
[58] Field of Search .................................... 285/256, 259, 285/330

[56] References Cited

U.S. PATENT DOCUMENTS

| | | | |
|---|---|---|---|
| 884,461 | 4/1908 | Browne | 285/259 |
| 2,139,745 | 12/1938 | Goodall | 285/259 |
| 2,147,355 | 2/1939 | Scholtes | 285/259 |
| 2,261,833 | 11/1941 | Kreyer | 152/429 |
| 2,371,971 | 3/1945 | Main et al. | 285/259 |
| 2,374,225 | 4/1945 | Melson | 285/256 |
| 2,479,499 | 8/1949 | Le Clair | 285/259 |
| 2,805,088 | 9/1957 | Cline et al. | 285/239 |
| 3,017,203 | 1/1962 | MacLeod | 285/259 |
| 3,228,713 | 1/1966 | Frost | 285/109 |
| 3,966,238 | 6/1976 | Washkewicz et al. | 285/239 |
| 4,330,142 | 5/1982 | Paini | 285/259 |
| 4,341,481 | 7/1982 | Wlollensak | 285/300 |
| 4,597,594 | 7/1986 | Kacalieff et al. | 285/239 |
| 4,603,890 | 8/1986 | Huppee | 285/239 |
| 4,664,424 | 5/1987 | Smith | 285/256 |
| 5,046,763 | 9/1991 | Martucci et al. | 285/81 |
| 5,064,223 | 11/1991 | Gross | 285/93 |
| 5,076,615 | 12/1991 | Sampson | 285/253 |
| 5,137,309 | 8/1992 | Beagle | 285/259 |
| 5,165,733 | 11/1992 | Sampson | 285/253 |
| 5,170,011 | 12/1992 | Martucci | 174/47 |
| 5,211,429 | 5/1993 | Charlson et al. | 285/238 |
| B1 5,124,878 | 4/1996 | Martucci | 361/215 |

FOREIGN PATENT DOCUMENTS

| | | | |
|---|---|---|---|
| 0066742 | 12/1982 | European Pat. Off. | F16L 33/22 |
| 2652872 | 4/1991 | France | F16L 33/00 |
| 3439522 | 8/1985 | Germany | F16L 33/18 |
| 4201799 | 7/1993 | Germany | F16L 47/06 |
| 1700328 | 12/1991 | Russian Federation | F16L 33/10 |
| 2216971 | 10/1989 | United Kingdom | F16L 33/20 |

*Primary Examiner*—Eric K. Nicholson
*Attorney, Agent, or Firm*—Kohn & Associates

[57] ABSTRACT

An end fitting assembly (10) for connecting a hose to an external device is disclosed. The end fitting assembly (10) includes a stem (11) adapted to be inserted into the inner channel (32) of a hose (30). The stem (11) includes an axial bore (13) adapted to convey a fluid therethrough. The stem (11) further includes a plurality of circumferential barbs (12), each of the barbs (12) including a plurality of lands (12a, 12b) at the outer surface thereof. One of the lands (12a) is disposed at an acute angle with respect to the axis of the bore (13) of the stem (11). A second one of the lands (12b) is disposed adjacent to the first land (12a) and is disposed at a smaller acute angle with respect to the axis of the bore (13) of the stem (11) than the angle of the first land (12a). The stem (11) further includes an additional barb (15) having a rotation resisting structure provided thereon to resist relative rotational movement between the stem (11) and a hose (30) into which the stem (11) is disposed. The end fitting assembly (10) also includes a connector (40) for connecting the end fitting assembly (10) to an external device.

12 Claims, 2 Drawing Sheets

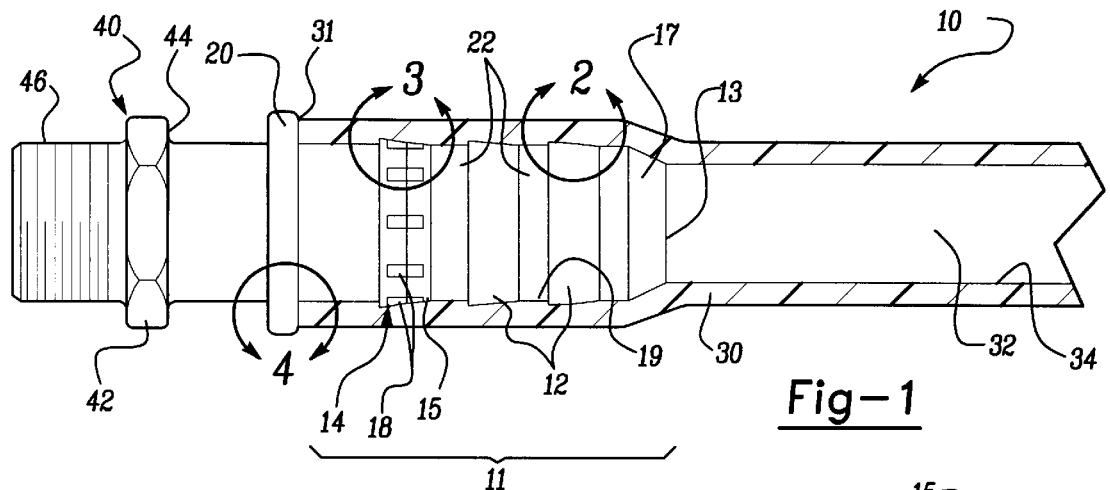
Fig-1
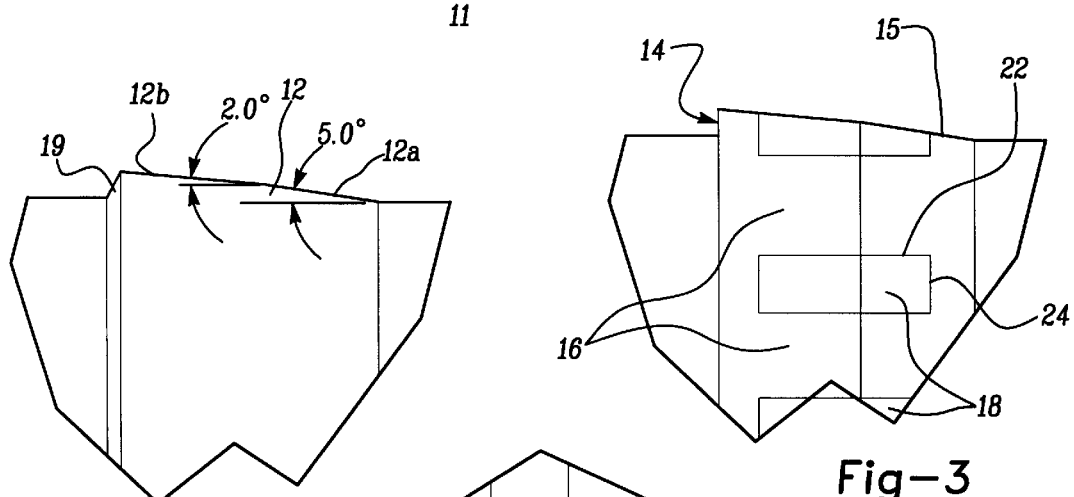
Fig-2
Fig-3
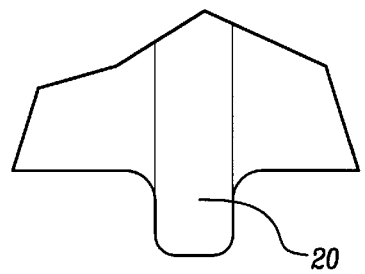
Fig-4
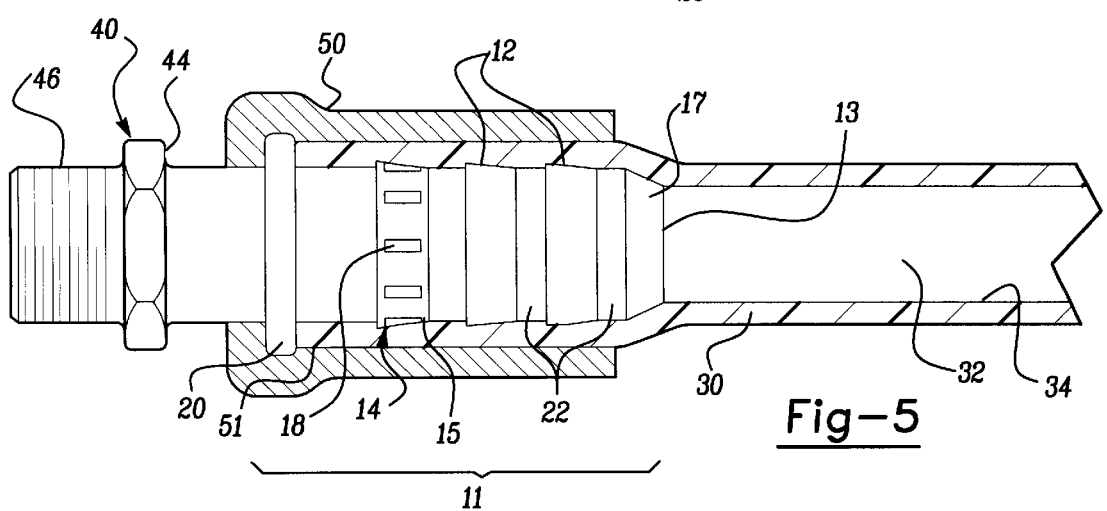
Fig-5

HOSE END FITTING ASSEMBLY

TECHNICAL FIELD

The present invention relates to an end fitting for a hose assembly. More specifically, the present invention relates to an end fitting adapted to be inserted into a hose for connecting the hose to an external device.

BACKGROUND OF THE INVENTION

It is common practice in the hose art to use barbed hose fittings to affix a hose fitting to a hose assembly. These end fittings are commonly attached to the hose by methods such as crimping to retain the fitting and to prevent the fitting from being pulled off of the hose assembly.

In today's increasingly more complex industrial and commercial environments, hoses and hose assemblies must be able to withstand harsh and highly demanding extremes of conditions. For example, hose assemblies are subjected to environments of extreme temperature and/or highly corrosive fluids. Chemically unreactive non-metallic fittings are particularly desirable when the hose is to be used in a corrosive environment. Furthermore, non-metallic hose fittings are generally lighter in weight and, in some instances, cheaper than conventional metallic hose fittings.

Current plastic end fitting designs require a heavy crimping force be applied about a collar around the hose and assembly to completely seal the interface between the end fitting and the hose to provide a fluid tight seal and to provide sufficient resistance to pull-off of the end fitting. In the typical environment in which a fuel hose and its associated components operate, continuous thermal-cycling can take place which has a tendency to induce a high degree of heat deflection in current plastic end fittings. The principal drawback of current end fitting designs is that the stress created by the crimp of a collar around a hose and end fitting magnifies the heat deflection effects caused by thermal-cycling. Additionally, the large crimping forces required to affix the end fitting to the hose can cause perforations or cuts to be formed in the hose which allow for the permeation of volatile fluids flowing therethrough.

A typical example of an end fitting which is inserted into a hose and affixed by crimping a collar around the hose and end fitting is shown in U.S. Pat. No. 4,664,424 to Smith. Unfortunately, the forces used to compress the hose between the end fitting and the crimp collar can be so great that they cause perforation or cutting of the hose thereby leading to permeation, leakage, or failure of the hose assembly at the point where the damage to the hose takes place. Frequently, this type of damage takes place where the hose is tightly pressed against barbs, ribs, or grooves disposed on the portion of the end fitting inserted within the hose. That is, the hose is pressed against edges or protrusions on the ribs or barbs when the crimp collar is compressed about the hose assembly and this locally intense pressure point can cause the above-mentioned damage to the hose. Additionally, damage to the hose can occur when the hose is allowed to rotate about the insert portion of the end fitting and thereby can potentially cause damage to the hose from the rubbing or cutting action of the ribs or barbs against the interior surface of the hose. Additionally, if the hose is allowed to break free of frictional loading with the barbs, i.e., after a collar has been crimped thereover, other detrimental conditions, such as permeation can occur.

Various approaches have been described for offering increased resistance to end fitting pull-off including increased crimping force and/or the use of some form of mechanism to prevent the rotation of the hose about the insert portion of the end fitting. Such a mechanism is disclosed in European Patent Application Number 0066742 wherein a series of longitudinally disposed teeth are used to prevent axial rotation of the hose about the end fitting. A drawback to this method, however, is that the ridges or barbs can still cause perforation or damage to the hose.

British Patent Application Number 2216971 discloses a hose end fitting in which a stem portion including a plurality of barbs in which the barbs each have a progressively increasing angle to reduce the incidence of failure of the hose at the stem. U.S. Pat. No. 5,211,429 to Charlson et al. discloses a pipe fitting having at least two axially spaced annular barbs wherein each barb is provided with a staggered angle or back rake configuration. The barbs are utilized to restrict movement of a sleeve (10) away from a pipe sought to be joined. In particular, the barbs of the sleeve compress the pipe radially inwardly and prevent its movement. The Charlson et al. patent discloses that the staggered angle or back rake configuration assists in the compression of the exterior surface of a pipe sought to be joined thereby preventing relative longitudinal movement therebetween.

Therefore, it would be advantageous to have an end fitting for a hose assembly which reduces or prevents barb-induced perforation of the hose and the resultant permeation of fluids flowing therethrough and which is resistant to end fitting pull-off. Additionally, it would be advantageous to have an end fitting which further reduces end fitting-induced damage to a hose by preventing axial rotation of the hose about the end fitting. Additionally, it would also be advantageous to have an end fitting which requires less crimp force than previous end fitting designs thereby eliminating excess stressing or pre-stressing of the insert portion of the end fitting and, thereby preventing damage to the hose caused by excess compression of the hose material against the ridges or barbs of the insert portion of the end fitting. Furthermore, it would be advantageous to have an end fitting which eliminates the drawbacks of the prior art end fittings discussed above.

SUMMARY OF THE INVENTION AND ADVANTAGES

According to the present invention, there is provided an end fitting for connecting a hose to an external device including a stem adapted to be inserted into the inner channel of a hose and having an axial bore for conveying fluid therethrough. The stem includes a plurality of circumferential barbs having a plurality of lands at the outer surface thereof wherein one of the lands is disposed at an acute angle with respect to the axis of the bore of the stem and a second land disposed adjacent to the first land is disposed at a smaller acute angle with respect to the axis of the bore of the stem. The stem further includes an additional barb having rotation resisting means provided therein to resist rotational movement between the stem and the hose into which the stem is disposed. A coupling means for connecting the end fitting to an external device is also provided.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a side view and partial cross-section of an embodiment of the invention;

FIG. 2 is an enlarged side view of circle 2 of FIG. 1;

FIG. 3 is an enlarged side view of circle 3 of FIG. 1;

FIG. 4 is an enlarged side view taken at circle 4 of FIG. 1;

FIG. 5 is a side view partially in cross-section of a preferred embodiment of the invention affixed to a hose;

DETAILED DESCRIPTION OF THE INVENTION

Figure 6:
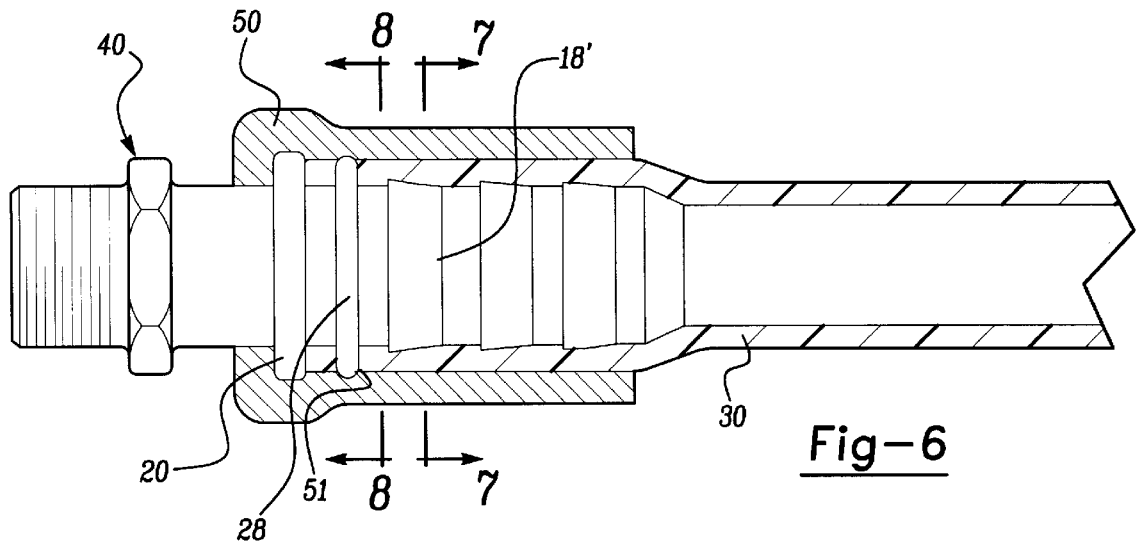
FIG. 6 is a side view partially in cross-section of another embodiment of the invention affixed to a hose.

An end fitting assembly of the type for connecting a conduit with a fitting is generally shown at 10 in the FIGS. Referring to FIG. 1, the assembly 10 includes a stem portion 11 adapted to be inserted into an inner channel 32 of a hose or conduit 30. The stem portion 11 includes an axial bore 13 which is adapted to convey a fluid therethrough. The portion of the stem 11 opposite the end at which the coupling 40 is disposed, includes a ramping surface 17 which is angled in such a manner as to provide easier insertion of the stem portion 11 of the end fitting 10 into the hose 30.

The stem portion 11 further includes a plurality of circumferentially disposed barbs 12. Each of the barbs 12 has a plurality of lands 12a, 12b disposed at the outer surface thereof. One of the lands 12a can be disposed at an acute angle with respect to the longitudinal axis of the bore 13 of the stem portion 11. The second of the lands 12b is disposed adjacent to the first land 12a and is disposed at a smaller acute angle than the first land 12a with respect to the longitudinal access of the bore 13. The barbs 12 are circumferentially disposed about the stem portion 11 of the end fitting assembly 10 and each barb includes a plurality of lands 12a, 12b on the outer surface thereof. The land 12a is disposed proximally to the land 12b. The land 12a is disposed at an acute angle with respect to the axis of the bore 13 of the stem portion 11. The second land 12b is disposed adjacent to the first land 12a and is disposed at a smaller acute angle with respect to the axis of the bore 13 than the angle of the first land 12a. That is, the lands are disposed at an angle of less than 90° with respect to the axis of the bore 13 of the stem portion 11. Generally, the most distal land has an angle less than the angle of the more proximal land of each barb 12 wherein the distal end of the end fitting assembly 10 is defined as the coupling end and the proximal end is defined as the insert end. In general, the angle of the lands 12a, 12b range from 0° to 25° with respect to the axis of the bore 13. Preferably, the angles of the lands is between 1° and 10°. Additionally, each barb 12 includes a circumferential inclined surface 19 which further reduces barb-induced damage to the hose 30 caused by crimping of the collar 50.

The stem portion 11 further includes an anti-rotation element 14 including an additional barb 15 having rotation resisting elements 18 disposed radially thereabout to provide resistance to relative rotational movement between the stem portion 11 and the hose 30 into which the stem portion 11 is inserted.

The rotation resisting mechanism can include a plurality of depressions 18 provided in the surface of the additional barb 15 which engage the inner surface 34 of the hose 30 into which the stem portion 11 is inserted as shown in FIGS. 1, 3, and 5. The depressions 18 are evenly spaced circumferentially about the barb 15. The depressions 18 include a plurality of axially oriented grooves disposed about the additional barb 15. The depressions 18 engage the inner surface 34 of the hose and prevent the rotation of the hose 30 about the end fitting assembly 10. The depressions 18 are defined by edges 22, 24 as best shown in FIG. 3.

Figure 7:
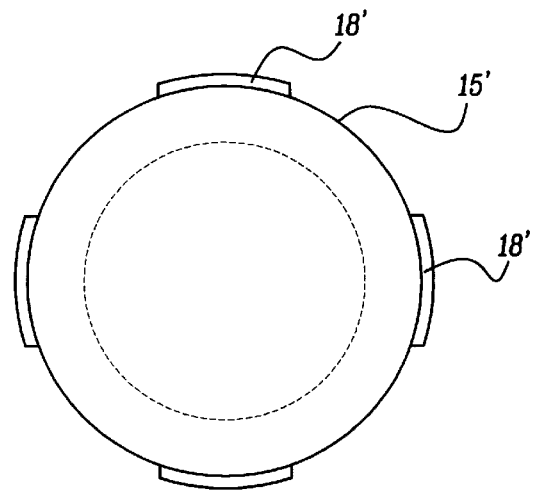
FIG. 7 is a cross-sectional view taken along lines 7—7 of FIG. 6.

Alternatively, as shown in FIGS. 6 and 7, the rotation resisting mechanism can include a plurality of protrusions 18' provided in the surface of the additional barb 15' which engage the inner surface 34 of the hose 30 into which the stem portion 11 is inserted. The protrusions 18' are evenly spaced circumferentially about the barb 15'. The protrusions 18' engage the inner surface 34 of the hose and prevent the rotation of the hose 30 about the end fitting assembly 10.

As shown in FIGS. 1, 3, 6, and 7, the depressions 18 or protrusions 18' are preferably disposed completely within the barb 15,15'. By disposing the depressions 18 or protrusions 18' completely within the field of the barb 15,15', a potential fluid leak path can be eliminated.

Alternatively, as shown in FIG. 5, the depressions 18 or protrusions 18' can be disposed at the edge of the barb 15,15'.

Figure 8:
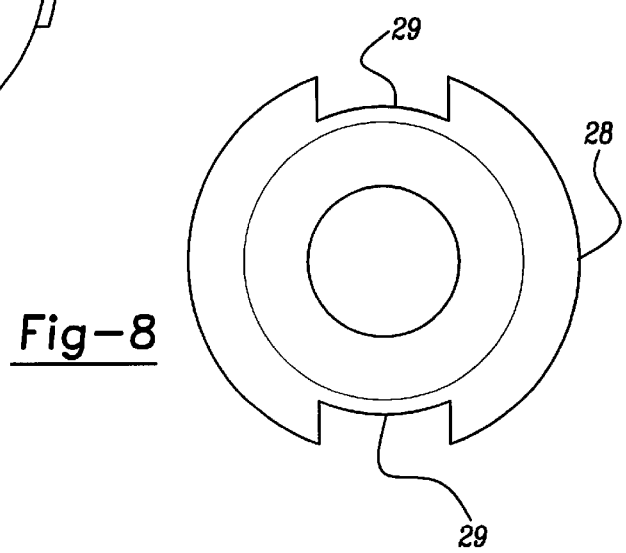
FIG. 8 is a cross-sectional view taken along lines 8—8 of FIG. 6.

As shown in FIGS. 6 and 8, an additional bead 28 can be utilized the end fitting assembly 10. The bead 28 includes a plurality of notches 29 provided in the surface of the bead 28 which engage an inner surface 51 of the collar 50 into which the stem portion 11 is inserted and fixed. The notches 29 are evenly spaced circumferentially about the bead 28. The notches 29 engage the inner surface 51 of the collar 50 and not only prevent the rotation of the hose 30 about the end fitting assembly 10 but, additionally, the notches 29 provide a mechanism for positively locating and retaining the collar 50.

The end fitting assembly 10 further includes a coupling 40 disposed at the end opposite to the end which is inserted into the hose 30. The coupling 40 includes a connecting portion extending longitudinally outwardly from the stem portion 11. The connecting portion connects the coupling 40 to a mating fitting (not shown). The connecting portion can include a flanged portion 42 adapted to receive a tool, such as a wrench, to hold the coupling 40 as the end fitting assembly 10 is being connected to the mating fitting (not shown). The flanged portion 42 defines a rear shoulder surface 44. The connecting portion can further include a threaded portion 46 extending longitudinally outwardly from the flange 42. The threaded portion 46 can comprise a male threaded portion as shown in FIGS. 1 and 5. Alternatively, the threaded portion can comprise a female threaded portion. Additionally, the coupling 40 can include any suitable coupling mechanism, such as a quick disconnect-type fitting, or other types of coupling mechanisms known to those skilled in the art.

When the end fitting 10 is inserted into the hose 30, the barbs 12 are compressed radially inwardly and engage an inner surface 34 of the hose 30 to prevent the end fitting 10 from being pulled from the hose 30 under axial tensile loads. The space between each barb 12 defines a space 22 which provides a sealing area which traps the walls of the hose 30 to aid in both the perfection of a seal between the hose 30 and the end fitting assembly 10 and increase the pull-off resistance of the end fitting assembly 10.

When a crimp collar 50, as shown in FIG. 5, is applied about the hose 30 and end fitting assembly, the pressure or force applied by the crimp collar 50 forces the wall of the hose 30 to conform about the barbs 12 and also forces the wall of the hose 30 into the sealing areas 22 to increase the pull-off resistance of the end fitting assembly 10 and also to effectively negate creep or cold flow. Additionally, when the end fitting 10 of the present invention is utilized with a hose assembly having a braided material therein, such as the hose described in U.S. Pat. No. 5,124,878, upon application of an axial tensile load, the braided material configures itself between the barbs 12 and the sealing areas 22 such that the braid pattern constricts and more tightly grips the end fitting assembly 10.

Furthermore, the end fitting 10 can be utilized without a collar in applications which do not require high pressure or high pull-off resistance.

By staggering the angles of the lands 12a, 12b of the barbs 12 and by disposing the ramping surface 19 on the barbs 12, cutting of the hose 30 by the barbs 12 during insertion or crimping is eliminated. That is, when force is applied about the hose 30 and the stem portion 11 inserted thereto by application of the crimping collar 50, the staggered or differentially angled lands 12a, 12b do not penetrate or perforate the wall of the hose 30. Furthermore, upon relative rotational movement of the hose about the stem portion 11, the staggered or differentially angled lands eliminate cutting of the hose 30.

Upon the application of an inward force, such as that applied by application of the crimping collar 50, the walls of the hose 30 engage the edges 22, 24 defining the grooves or depressions 18 of the rotation resisting means thereby preventing the rotational movement of the hose 30 about the stem portion 11 of the end fitting assembly 10. Additionally, the use of the grooves or depressions 18 to prevent the rotation of the hose 30 about the end fitting assembly 10, allows for a lighter or smaller crimp force to be applied to the assembly 10 thereby further eliminating damage to the hose 30 and assembly 10 and additionally allowing for a lighter and less expensive end fitting assembly to be manufactured and used since the lighter weight hose assembly provides both increased pull-off resistance and eliminates end-fitting induced hose damage. Since a smaller crimp force is necessary to secure the end fitting assembly 10 to the hose 30, the end fitting assembly 10 can be made more economically as less material is required for construction.

Referring specifically to FIGS. 1 and 4, the end fitting assembly 10 can further include a circumferential bead 20 disposed about the stem portion 11 to be engaged by the clamp 50 utilized to clamp the hose 30 to the end fitting assembly 10. The bead 20 includes a surface to provide for a mechanical lock between the crimp collar 50 and the end fitting assembly 10. The bead 20 provides increased resistance to pull-off of the hose 30 and crimp collar 50 from the end fitting assembly 10 under axial tensile loads as it provides an additional element to secure the end fitting assembly 10 to the hose 30. The addition of the bead further reduces the necessity for using a large or excess crimping forces to retain the hose 30 to the end fitting assembly 10.

Generally, the end fitting assembly 10 can be constructed of any suitable material capable of withstanding the environment for which it is designed to be used for example, plastics (polymers) and/or metals. Preferably, the end fitting assembly 10 is constructed of a polymeric material such as polyamides, polyvinyls, fluoropolymers, aliphatic polyketones, PPS, and/or mixtures, blends or alloys thereof. The end fitting assembly is manufactured using standard molding equipment well known to those skilled in the art. Additionally, the material used to construct the end fitting 10 can be reinforced by mixing or filling with materials such as glass, glass fibers, minerals, carbon fiber, metals, metal fibers, or combinations thereof.

Additionally, the end fitting 10 can be made static dissipative by the additions of conductive material such as carbon black powder, carbon fiber, metal powders or fibers and/or mixtures thereof to the material which comprises the end fitting 10 to conduct and dissipate static electrical build up.

Additionally, inserts such as metal rings or dissimilar plastics can be insert-molded into the end fitting assembly 10 to alter or enhance the characteristics of the end fitting 10, such as to increase its hoop strength.

In order to affix the end fitting assembly 10 to a hose 30 for connection to an external device, the end fitting assembly 10 is first inserted into the hose 30 to the point where an end 31 of the hose 30 is in close proximity to the bead 20. The crimp collar 50 is positioned about the hose 30 and the end fitting assembly 10. The crimp collar 50 is then compressed or molded onto the end fitting 10 utilizing techniques and equipment well known to those skilled in the art. The compressive forces of the crimp collar 50 about the hose 30 and insert portion 11 of the end fitting assembly 10 radially compresses the hose 30 and the stem portion 11 which causes the hose 30 to engage the barbs 12, 15, as best viewed in FIG. 5. This force prevents both the removal or pull-off of the end fitting assembly 10 from the hose 30 and rotation of the hose 30 about the end fitting assembly 10.

The invention has been described in an illustrative manner, and it is to be understood the terminology used is intended to be in the nature of description rather than of limitation.

Obviously, many modifications and variations of the present invention are possible in light of the above teachings. Therefore, it is to be understood that within the scope of the appended claims, reference numerals are merely for convenience and are not to be in any way limiting, the invention may be practiced otherwise than as specifically described.

We claim:

1. An end fitting (10) for connecting a hose to an external device, said end fitting (10) comprising:
    a stem (11) adapted to be inserted into an inner channel of a hose and defining a longitudinal axis, said stem comprising an axial bore (13) adapted to convey a fluid therethrough;
    said stem (11) having a plurality of circumferential barbs (12) extending radially outwardly from said stem (11), each of said barbs (12) having a plurality of lands (12a, 12b) at an outer surface thereof, one of said lands (12a) being disposed at a acute angle with respect to the axis of the bore (13) of said stem (11), and a second one of said lands (12b) being adjacent to said first land (12a) and being disposed at a smaller acute angle with respect to the axis of the bore (13) of said stem (11);
    said stem (11) including at least one additional barb (15,15') having rotation resisting means provided therein to resist rotational movement between said stem (11) and a hose into which said stem (11) is disposed.

2. An end fitting (10) according to claim 1, wherein said rotation resisting means provided in said additional barb (15) further includes a plurality of depressions (18) and/or protrusions (18') provided in the surface of said barb (15) to engage the inner surface of a hose into which said stem (11) is inserted.

3. An end fitting (10) according to claim 2, wherein said depressions are a plurality of axially oriented grooves (18).

4. An end fitting (10) for connecting a hose to an external device, said end fitting (10) comprising:

a stem (11) adapted to be inserted into an inner channel of a hose and defining a longitudinal axis, said stem comprising an axial bore (13) adapted to convey a fluid therethrough;

said stem (11) having a plurality of circumferential barbs (12) extending radially outwardly from said stem (11), each of said barbs (12) having a plurality of lands (12a, 12b) at an outer surface thereof, one of said lands (12a) being disposed at an acute angle with respect to the axis of the bore (13) of said stem (11), and a second one of said lands (12b) being adjacent to said first land (12a) and being disposed at a smaller acute angle with respect to the axis of the bore (13) of said stem (11);

said stem (11) including at least one additional barb (15, 15') having rotating resisting means provided therein to resist rotational movement between said stem (11) and a hose into which said stem (11) is disposed, said first land (12a) of said barb (12) is disposed at an angle of about 2 degrees with respect to the axis of said bore of said stem (11), and wherein said second land (12b) of said barb (12) is disposed at an angle of about 5 degrees with respect to the axis of said bore of said stem (11).

5. An end fitting (10) according to claim 1, wherein said stem (11) additionally is provided with a circumferential bead (20) adapted to be engaged by clamp means utilized to clamp a hose to said end fitting (10).

6. An end fitting (10) as set forth in claim 1 wherein said barbs (12) are spaced apart axially.

7. An end fitting (10) according to claim 1, wherein said rotation resisting means provided in said additional barb (15') further includes a plurality of protrusions (18') provided in the surface of said barb (15') to engage the inner surface of a hose into which said stem (11) is inserted.

8. An end fitting (10) according to claim 1, wherein said stem (11) additionally is provided with a circumferential bead (28) having circumferentially disposed notches (29) adapted to be engaged by clamp means utilized to clamp a hose to said end fitting (10).

9. An end fitting (10) according to claim 1, wherein said circumferential barbs (12) include an inclined surface 19.

10. A method of connecting an end fitting of an external device to a hose, said method including the steps of:

disposing an open end of a hose over an end fitting, the end fitting including a plurality of circumferential barbs (12) extending radially outwardly from the stem (11), each of the barbs (12) having a plurality of lands (12a, 12b) at an outer surface thereof, one of the lands (12a) being disposed at an acute angle with respect to the axis of the bore (13) of the stem (11), and a second one of the lands (12b) being adjacent to the first land (12a) and being disposed at a smaller acute angle with respect to the axis of the bore (13) of the stem (11), the stem (11) including at least one additional barb (15, 15') having rotating resisting means provided therein to resist rotational movement between the stem (11) and a hose into which the stem (11) is disposed and retaining the hose on the end fitting without the barbs cutting the hose; and retaining the hose on the end fitting without the barbs cutting the hose.

11. A method of connecting an end fitting of an external device to a hose according to claim 10, further including the steps of sandwiching the end of the hose between the end fitting and a smooth bore crimping collar without the barbs penetrating or perforating a wall of the hose.

12. A method of connecting an end fitting of an external device to a hose according to claim 11, wherein said sandwiching step is further defined as retaining the end of the hose between the collar and end fitting while maintaining the smooth bore of the collar.

* * * * *